Feb. 6, 1968   R. C. McMASTER ETAL   3,368,085
SONIC TRANSDUCER
Filed Nov. 19, 1965   4 Sheets-Sheet 1
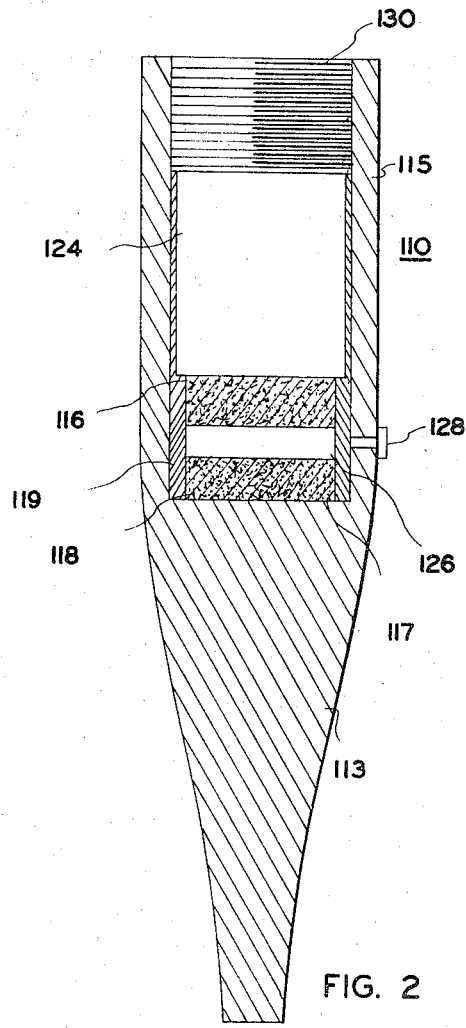
FIG. 2
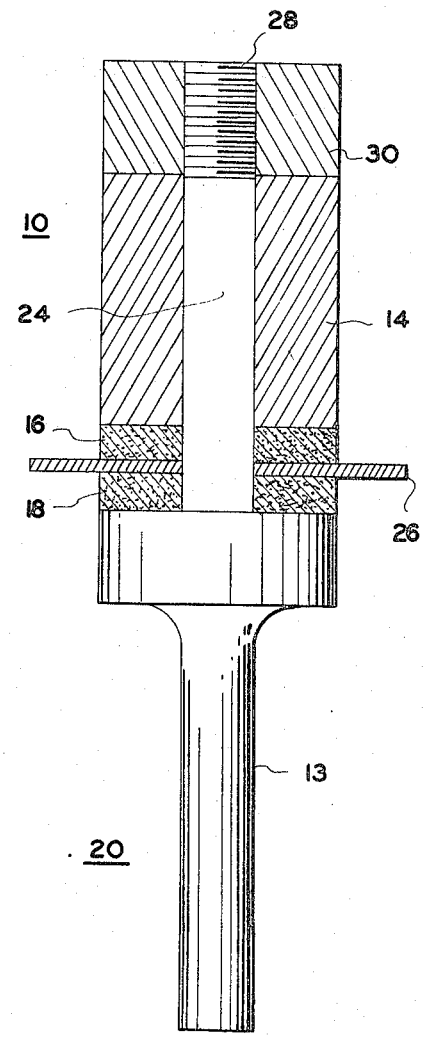
FIG. 1
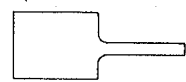
FIG. 5D
FIG. 5C
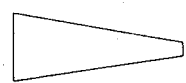
FIG. 5A
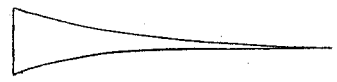
FIG. 5B
FIG. 5
INVENTORS
Robert C. McMaster
Berndt B. Dettloff
Anthony D. Cennamo

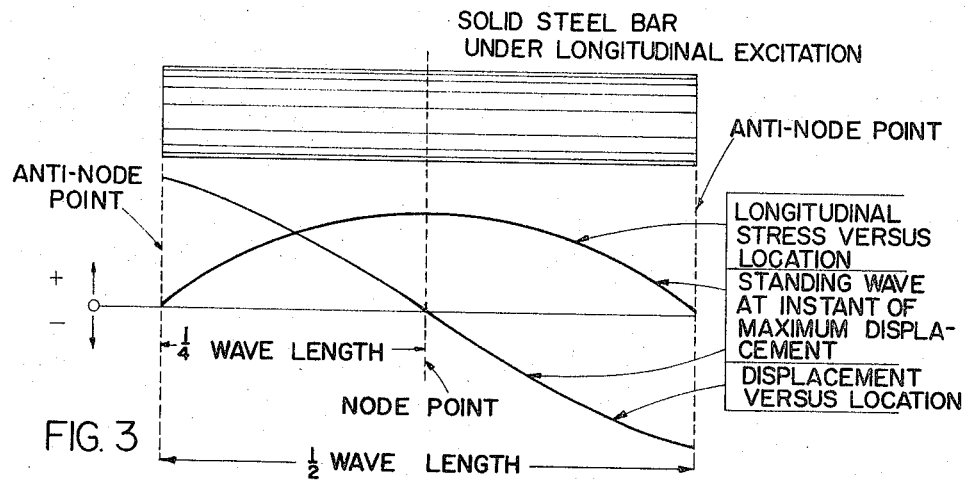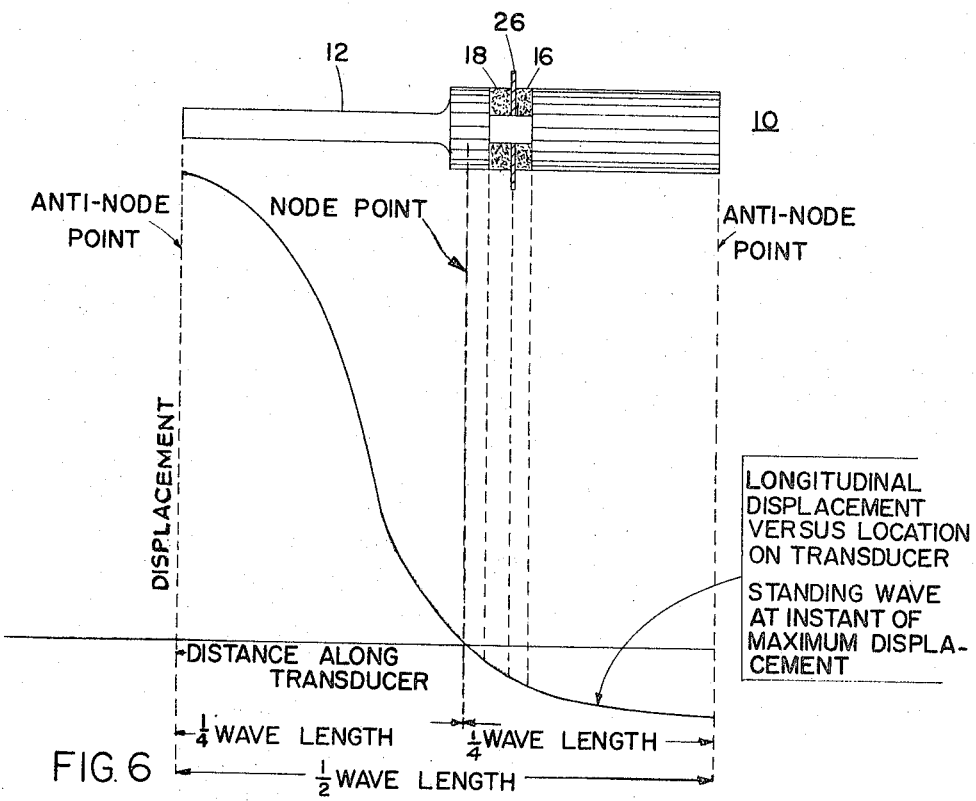

United States Patent Office 3,368,085
Patented Feb. 6, 1968

3,368,085
SONIC TRANSDUCER
Robert C. McMaster and Berndt B. Dettloff, Columbus, Ohio, assignors to The Board of Trustees of the Ohio State University, Columbus, Ohio, an institution of Ohio
Filed Nov. 19, 1965, Ser. No. 508,812
13 Claims. (Cl. 310—8.3)

ABSTRACT OF THE DISCLOSURE

The invention relates to an ultrasonic piezoelectric transducer—specifically, the transducer combines a driving element (piezoelectric disc) with the mechanical displacement amplifier (horn). It is, in essence, a resonant horn structure excited internally relatively close to the vibrational node. The method of excitation is in contrast to the method of external excitation at the antinode common when horns are utilized in a sonic transducer system. In a preferred embodiment the piezoelectric elements located in a region near the node of the resonant structure allows the node to be used as the position of mounting of the transducer and for applying external static force.

Background

A piezoelectric transducer is a device capable of transforming high frequency electrical impulses into high frequency mechanical impulses. With an alternating-polarity input-voltage imposed on the piezoelectric elements, the transducer generates, transmits and amplifies a series of mechanical compression waves in its metal structure. The succession of identical compression and tension waves transmitted in a transducer of proper length, produces a standing wave pattern.

In a straight bar the standing wave maxima and minima locations correspond to locations of maximum and minimum velocity, minimum and maximum stress, and maximum and minimum displacement. These locations determine optimum positions for points-of-support, "steps" or changes in diameter, tools or mechanical coupler, etc. The node locations on the transducer correspond to locations of minimum axial displacement and velocity, the anti-node locations correspond to locations of maximum axial displacement and velocity of motion. The distance between adjacent anti-nodes corresponds to one-half wavelength at the fundamental resonant frequency.

The prior art is replete with various forms of electromechanical transducers. Piezoelectric, as well as magnetostrictive devices, have been developed for various and sundry applications. The uses of sonic energy has been suggested extensively in all fields of endeavor including cleaning processes, power transfer, measuring instruments, and communication.

Despite its unique effects and useful properties, sonic energy is not proven to be the complete answer to high-power engineering problems. Next to the forms of penetrating radiation, sonic energy has been the most expensive and difficult-to-generate forms of energy available to engineers. Consequently, ultrasonic energy has not found applications in areas where conventional forms of energy can do an entirely adequate job. High-power ultrasonic equipment is not commercially available at present.

In view of the design, development, fabrication, and reduction to commercial practicality, transducers suitable for converting electrical into mechanical energy at sonic and high frequencies are also not available commercially. Finally, major problems exist in coupling high levels of ultrasonic or sonic energy to massive and irregular structures such as civil engineering structures.

The present invention overcomes the above noted need by providing a high power, high Q transducer. The transducer is capable of continuous high mechanical output with an extremely high efficiency of energy transformation.

The relative increase in capacity with respect to the previous state of the art (for the weight of transducer and a given frequency) is due to the efficient use of the materials in the transducer. The materials are used within their working stress limits.

In the transducer of the present invention the piezoelectric driving element (which is generally weak in tension) is biased by a static compressive force. Under dynamic excitation the piezoelectric element will not be stressed in tension but rather operate always under compression. Thus the stress during operation will range between a minimum stress (compressive) and its maximum allowable stress. The maximum limit on the compressive stress in the driving element is dictated by the stress at which depolarization occurs, in the case of ceramic elements.

In certain applications there are required high velocity outputs from transducers. A transducer design limitation is the maximum stress allowable in each of the active elements. To overcome this limitation transducers in the prior art are built to have high outputs, but they will involve an additional half-wave horn at the output end that has only a moderate magnification (e.g., Gaussian vibrator). Thus the input end of the horn requires still a considerable velocity of the driver which cannot be met with presently known active elements (piezoelectric or magnetostrictive). Therefore an additional horn is required in the previous state of the art transducers between the output horn and the driver. The use of multiple horns increases power losses and space-weight requirements. The present invention successfully recognizes the stress limitation and yet eliminates the necessity of the extra horn. This is accomplished by making the output horn the transducer proper and driving this horn at a location of lower velocity (i.e., close to its node). The results are a transducer that is sturdy, practical and capable of continuous service.

In order to achieve large displacements or high velocities at the output end of the transducer, high stresses have to be accommodated in the transducer. In the transducer of the present invention the high stresses occur at a different part of the transducer away from the location of the driving elements. Thus this horn is not a solid body composed of a single material but is composed of different materials at different locations. Consideration is given also to fatigue limits for continuous and long life operation.

In an over-all analysis of the transducer of this invention the full capabilities of the materials are utilized by a balanced design. No one part alone of the design limits the capacity of the transducer; but rather as many parts as feasible work to their maximum capability. This fact plus the minimum resonant over-all length (one-half wave), reduces the required volume and weight. The result is that high HP output per pound of transducer material is made possible.

Brief description of invention

More specifically, the transducer of the present invention combines a driving element (piezoelectric disc) with the mechanical displacement amplifier (horn) in a novel way. It is, in essence, a resonant horn structure excited internally relatively close to the vibrational node. The method of excitation is in contrast to the method of external excitation at the antinode common when horns are utilized in a sonic transducer system. In a preferred embodiment the piezoelectric elements located in a region near the node of the resonant structure allow the node to be used as the position of mounting of the transducer and for applying external static force.

*Objects*

It is accordingly a primary object of the present invention to provide a new and improved high power high Q transducer.

Another object of the invention is to provide a transducer capable of continuous high mechanical output with an exceptionally high efficiency of energy transformation.

Another object of the invention is to provide a transducer that employs a constant static internal compressive stress on the piezoelectric elements larger in magnitude than the alternating stress amplitude generated in the piezoelectric elements.

A further object of the invention is to provide a transducer that is extremely rugged, very simple in design, and capable of repetitive manufacture.

*Brief description of drawings*

Further objects and features of the invention will become apparent from the following detailed description when taken in conjunction with the drawings in which:

FIGURE 1 is a preferred embodiment of the resonant horn structure of the present invention;

FIGURE 2 is an alternative arrangement of the resonant horn structure of the present invention;

FIGURE 3 is a graph displaying acoustic displacement and stress relative to a physical acoustic rod;

FIGURE 5 is an alternative embodiment of the present invention utilizing a catenary type of horn;

FIGURE 5a utilizes a conical type of horn;

FIGURE 5b an exponential type of horn;

FIGURE 5c utilizes a Fourier type of horn;

FIGURE 5d utilizes a stepped type of horn similar to the preferred embodiment of FIGURE 1;

FIGURE 6 is the illustration of FIGURE 3 relative to the transducer of FIGURE 1;

*Detailed description of drawings*

Figure 4:
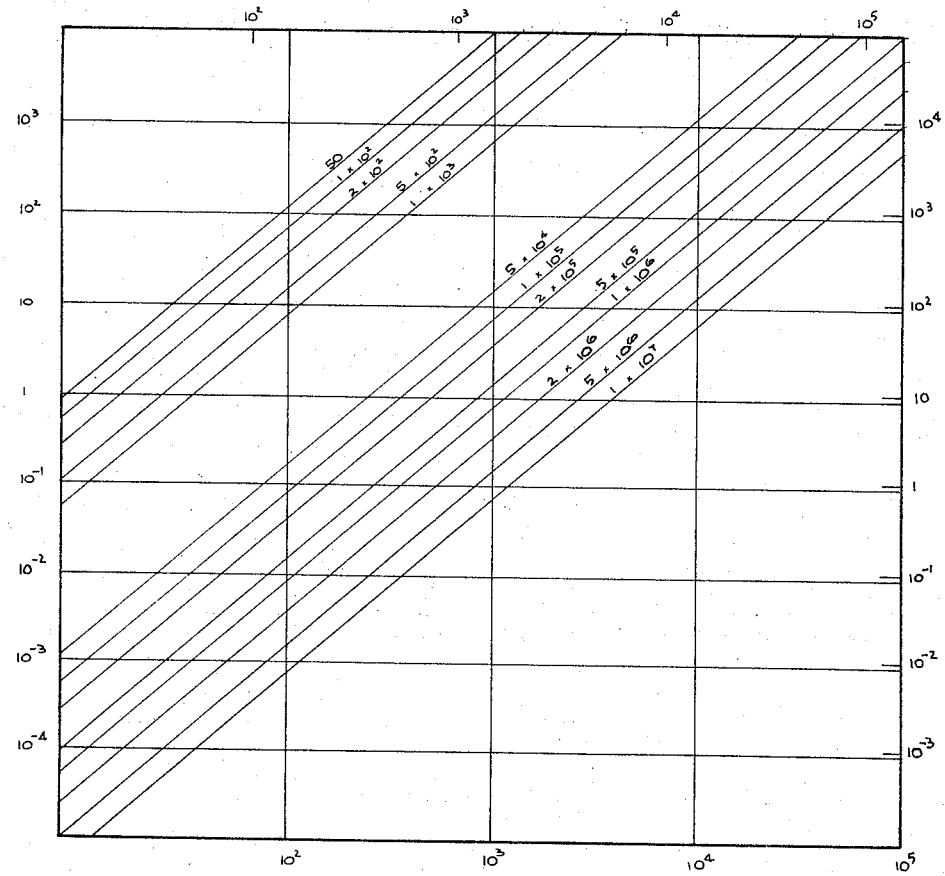
FIGURE 4 is a graph illustrating maximum transmissible power versus maximum stress for various values of acoustic impedance.

In accordance with the general concepts of the invention, the transducer is a horn half a wave-length long subdivided into two parts. The two transducer driver elements, acting mechanically in series, have been placed between the two parts. The lower part is the high amplitude end and the upper part the low amplitude end.

The slender output end of the horn has a diameter less than the large end and an amplitude of vibration that is governed by the geometry of the horn shape. The piezoelectric elements are connected in parallel electrically by a common electrode between them. The reduction in diameter in the horn has been located below the node and the piezoelectric elements have been located above the node. Alternatively, the piezoelectric elements may be located below or both above and below the node if desired. The node point is preferably reserved for mounting.

The problem of tension in the ceramic or across the joints has been overcome by application of mechanical bias. This bias is applied as a compressive stress larger in magnitude than the alternating stress amplitude generated in the piezoelectric elements.

The "sandwich" technique of transducer system construction was apparently invented by Langevin and patented in Great Britain—British patent specification 145,691. In the Langevin system two steel or stainless steel blocks of equal thickness are placed one on each side of a mosaic of quartz crystals. The system resonates as a half-wave vibrator with the quartz (which is comparatively thin) located essentially at a node.

The Langevin crystal at the node type of sandwich has been suggested in many modified forms in the prior art transducers, i.e., U.S. Patents 3,162,368, 3,140,859, and 3,101,419. Significantly, in each of the Langevin prior art type of structures there is no mechanical displacement amplifier (horn) or alternatively the transducer is generally a horn supplemented at least on one end of the sandwich structure making the transducer larger than half-wave vibrator.

Vibratory mechanical displacement amplifiers—commonly referred to as horns—can assume various forms and configurations. A conventional or typical work producing transducer will comprise a piezoelectric or magnetostrictive arrangement as the driver having coupled thereto a vibratory member generally a horn.

Elongated mechanical vibratory members exponentially tapered to effect an amplification of longitudinally vibratory motion are described in U.S. Patent No. 2,573,168, granted Oct. 30, 1951, to W. P. Mason.

It is also known in the art that a "stepped" vibratory member having two sections of similar transverse cross-sectional shape but radially differing cross-sectional areas, each section being substantially one-quarter wave-length long, can be employed to effect an amplification of longitudinally vibratory motion. "Stepped" members are discussed, for example, by L. Balamuth in "The Transactions of the Institute of Radio Engineers, Professional Group on Ultrasonics Engineering" (2), November 1954; see particularly sec. 8, page 29.

The "stepped" type of vibratory member mentioned above is limited as a practical matter by the strains generated in the member to relatively much smaller amplitude of vibration than those which are frequently desirable.

The displacement amplitude for a transducer is not very important in itself for the evaluation of the transducer. For example, a low frequency transducer of lower quality (e.g., tuning fork) can have a much higher amplitude although a very low velocity output. Thus the frequency at which this amplitude of displacement occurs is important. In the final analysis the amplitude of velocity of the output end takes into consideration both quantities (the product). Therefore velocity amplitude of the output end is referred to when comparing the outputs of various transducers—unless the frequency of operation is stated simultaneously with the displacement amplitude.

In amplitude of motion or velocity the maximum is limited by the strain or stress in the material. All designs for maximum velocity (maximum displacement at a given frequency) of the output end are always designs that utilize the maximum allowable stress for the material over a considerable portion of the structure, but the resulting shape of the horn cannot provide for a very high amplification. Shapes for the highest amplitude of velocity are Gaussian vibrators or horns since these have the highest ratio of output velocity amplitude to maximum stress.

In magnification or amplitude ratio the stepped horn is the shape with the highest magnification in the present state of the art although this shape cannot be used for very high amplitudes since the stresses in this shape will be very high. Or, to put it differently, the ratio of output velocity amplitude to maximum stress is low for the stepped horn.

The exponentially tapered members and other tapered members can, as a practical matter, provide higher amplitudes of vibration than the "stepped" members. However, the exponentially tapered and similarly shaped members, for large amplitude ratio, become so slender (as taught in the prior art devices) that over a considerable fraction of their total length they have been difficult to manufacture and difficult to use. This has been attributed to the unwanted flexural vibration or motion of the slender portion of the member that can scarcely be avoided. Accordingly, the exponential horn has lacked sufficient stiffness at large amplitude ratios to function in a completely satisfactory manner.

Another class of displacement amplifiers is disclosed in U.S. Patent No. 3,175,406 to Edward Eisner and referred to therein as "Fourier" vibrators. As set forth below, this class of vibrators are capable of providing very large amplitudes of vibratory motion and at the same time have a degree of stiffness which is entirely sufficient for the contemplated uses of the members.

Still another type of displacement amplifiers are referred to as the "Gaussian" vibrators described by C. Kleesattel in Acoustica, vol. 12, 322 (1962) and U.S. Patent No. 2,948,154.

Finally, other horn configurations may be of the conical types or catenary.

Although certain preferred embodiments have been constructed that produce unusually good results, the invention is not intended to be limited to the specific horn structure utilized. The principles of the resonant horn of the invention may be incorporated into any of the above-mentioned types of horn structures or other shapes of horn structures.

Referring now to FIGURE 1, there is shown one of several preferred embodiments of the present invention utilizing the basic concept of integrating the Langevin sandwich with the displacement amplifier. In essence, the design is a resonant stepped horn or acoustic concentrator, half a wavelength long. It is excited internally, close to its vibrational node. This contrasts with excitation being applied externally at or adjacent to an antinode, which is common practice when horns are applied in an ultrasonic transducer system.

Specifically, the transducer is a stepped horn half a wavelength long which has been subdivided into two parts, 10 and 20. The two transducer elements, 16 and 18, acting mechanically in series, have been placed between the two parts. The lower part 20, which contains the step 13, incorporates a center bolt 24 extending upwardly into the upper part 10 of the transducer. The spacer 14 has been center bored at 32 to accept the bolt 24, a nut 30 turning on the threaded bolt 28, presses down upon the spacer 14 which in turn presses down on the active elements 16 and 18. The nut 30 has the same diameter as, and actually forms a continuation of, the upper part of the spacer 14.

This construction eliminates the need of separate elements, since the entire structure encompasses the driver and constitutes a horn.

The problem of tension in the ceramic or across the joints has been solved in this design by application of mechanical bias. This bias is applied by center bolt 24, spacer 14, and nut 30 as a compressive stress larger in magnitude than the alternating stress amplitude in the piezoelectric elements 16 and 18.

The slender end of the horn part 12 of the transducer is considerably less in diameter than the large end. For the proportion and geometry shown the amplitude of vibration of the small end is roughly ten times greater than the large end. The two piezoelectric elements, 16 and 18, are nominally of a diameter equivalent to upper part 14 and nut 30. The electric elements are connected in parallel electrically by a common electrode 26 between them. This electrode 26 has a hole in the center and the bolt 24 runs through the piezoelectric wafers 16 and 18 and similarly shaped electrode 26. The bolt 24 is insulated from the piezoelectric wafers 16 and 18 and the electrode 26 by an electrical insulating material 19 of fiberglass impregnated with a bonding resin, or similarly strong resilient high dielectric material. The bolt aligns the spacer and insulation thereon radially align the piezoelectric wafers and the electrode.

The step 13 in the horn has been located half an inch below the node and the piezoelectric elements 16 and 18 have been located above the node. Although this configuration may cause a small reduction in amplification, the step and the active elements are spaced apart to make the node available for attachment of clamps and holding fixtures and to provide a stiff seat for the wafers.

It is to be understood that the term wafer as used herein comprises a disc-like structure having a concentrically located aperture.

In this design, the clamping structure is integral with, and a constituent part of, the acoustically resonant structure of the horn. This clamping structure consists of an internal tensile member and an external compressive member (or vice versa). The dynamic stress is substantially the same in both the center bolt and the spacer-nut portion both of which are located in the upper part of the transducer.

The initial stress on the piezoelectric wafers (applied by the clamping structure, through tightening of nut 30) is constant and predictable. It may be measured without excitation, with the assurance that it will remain at this level of stress under excitation.

Referring to FIGURE 2 there is shown an alternative arrangement of the resonant horn structure of the present invention. Generally, this alternative arrangement taken together with the arrangement of FIGURE 1 illustrates clearly that the over-all transducer is simply a resonant structure. That is, the resonant element is the horn that comprises the entire structure. More particularly, the primary difference between the structure of FIGURE 1 and FIGURE 2 is that upper body portion has its outside integrally formed with the lower portion; whereas in the embodiment of FIGURE 1 the upper body portion has its inside integrally formed with the lower portion. The embodiment of FIGURE 1 has an internal tensile member and an external compressive member comprising an upper part. The embodiment of FIGURE 2 has an external tensile member and an internal compressive structure in the upper part. More precisely, the embodiment of FIGURE 1 has the upper part initially turned down whereas the embodiment of FIGURE 2 has the upper part hollowed out. In either case, however, when completely assembled, the entire assembly of components form the resonant structure. Consequently, the functional operation of both embodiments is identical.

Specifically, the transducer of FIGURE 2 may also be considered as having upper part 110 and lower part 120. The two transducer elements 116 and 118 are centrally positioned with respect to the two parts. The lower part comprising taper 113 includes the outer shell 115 of the upper part.

In practice, the entire structure is initially of solid material and the upper part (essentially one half) is bored out. The two piezoelectric discs (not apertured), 116 and 118, are positioned at the base 117 of the bore. The discs, 116 and 118 are insulated from the inside of the shell 115 by suitable insulation material 119. The electrode 126 is positioned between the discs 116 and 118 and excited by electrical energy fed thereto by way of the feed through insulator 128.

Positioned on top of the discs 116 and 118 within the bore of the upper part 115 is the compression member 124, i.e., spacer. Finally inserted in the bore is the screw plug 130 in threaded engagement with the inside of the upper part of shell 115. This plug, as set forth above, is utilized to apply the initial static stress. The shell 115 comprises the tensile member of the over-all structure.

The theory of sonic energy as related to the transducer of the present invention may now be described in conjunction with the diagrammatic illustration of FIGURE 3. There is shown a physical rod (acoustic thin-rod) together with related points of displacement and stress. The points are connected by dotted lines. The center of the rod corresponds to a location on the chart of zero longitudinal displacement and to the location of maximum longitudinal stress. The ends of the rod correspond to locations on the chart of maximum longitudinal displacement. The assumptions are (1) the rod is being excited in a longitudinal acoustic node, (2) the rod is in free-air, i.e., not connected to any other solid. The concept of standing waves has been described.

In the diagram of FIGURE 6 the same relationship described with respect to FIGURE 3 is related specifically to the transducer of FIGURE 1. It is to be noted that the physical distance on the transducer corresponding to ¼ wavelength is not the same on the reduced diameter portion 13 thereof than on the larger diameter end 14. On a rod of constant diameter the ¼ wavelength is the same physical distance on either side of the node. The change in diameter in the half-wave horn is illustrated in the graph of FIGURE 6 as being the cause of a much larger amplitude of longitudinal vibration at a reduced diameter end 13. This is the purpose of the horn.

It is to be noted further in the diagram of FIGURE 6 that the driving elements 16 and 18 are not located at the node but near the node. The chart indicates that the transducer displacement amplitude at this point is a very small fraction of that at the horn tip. The most significant over-all point of the diagram of FIGURE 6 is that the transducer consists of and comprises a ½-wavelength horn. The driving elements are both located nearer to the free end than is the node.

Figure 7:
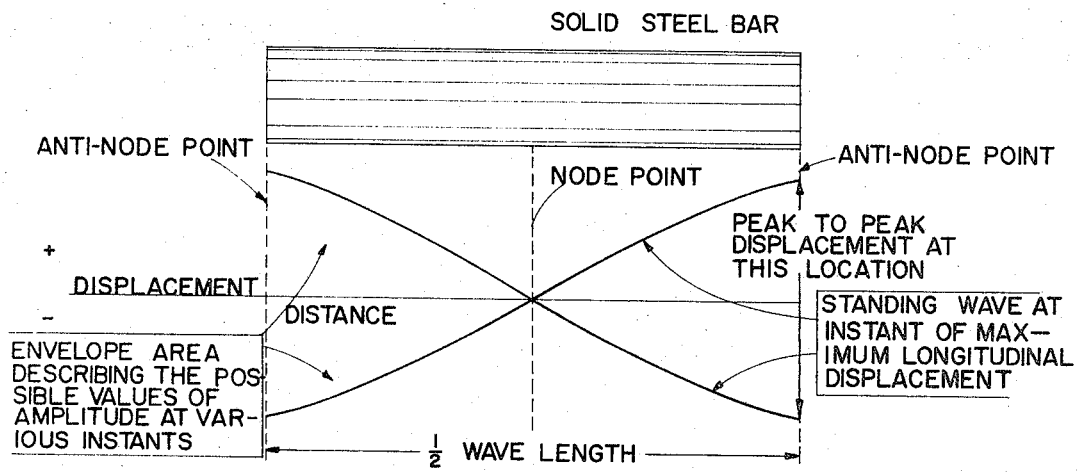
FIGURE 7 illustrates a standing-wave pattern in the theory of operation of the transducer of FIGURE 1.
Figure 8:
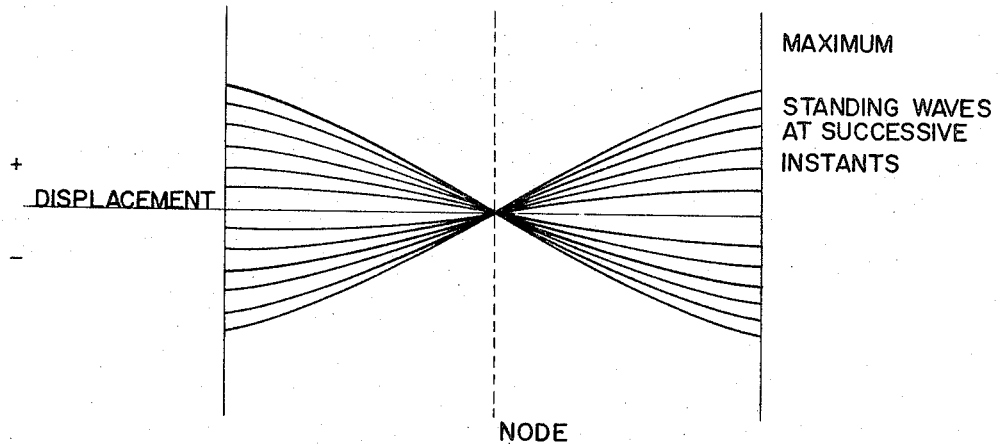
FIGURE 8 illustrates the standing waves of FIGURE 7 at successive instants.

The diagram of FIGURE 7 describes more completely a standing-wave pattern than do FIGURES 3 and 6. This demonstrates that a standing-wave diagram is actually an "envelope" describing an area in which, at successive instants, the instantaneous standing wave may be located. The diagram of FIGURE 8 illustrates standing waves at successive instants.

In the design of sonic or ultrasonic transducers or transmission lines it is sometimes necessary to design for power handling capacity, just as an electric power company requires that electrical generating equipment and transmission lines be designed for maximum kva. capacity.

Referring to FIGURES 5, 5a, 5b, 5c, and 5d, there are illustrated alternative resonant structures that may comprise the concepts of the present invention. FIGURE 5 illustrates a conical structure, FIGURE 5b exponential structure, FIGURE 5c Fourier structure, and FIGURE 5d stepped structure. In each of these structures there would be included the Langevin sandwich integrally formed with the displacement amplifier.

In one preferred embodiment shown in FIGURE 5c the Fourier horn appeared to have the advantage of low internal stresses compared to the stepped horn and high rigidity compared to the exponential horn. Thus the fourth-order Fourier horn presents a good compromise between rigidity and internal stress generated at resonance.

A further advantage for this type of shape is that it can be analyzed mathematically more easily than a stepped horn. Generally in the stepped-horn design, the fillet used at the step and different locations of the step with reference to the nodal plane, will cause changes in amplification and resonance frequency that are difficult to predict with the desired accuracy. Thus an accurate stepped-horn design has to be empirical. Moreover, the one-dimensional mathematical model, generally assumed in the derivation for the differential-horn equation, is only a crude approximation in the case of the stepped-horn design. The assumption of plane wave distribution across the cross-section of the horn breaks down at the step of the horn, when higher amplifications are considered.

Furthermore, the Fourier horn is ideally suited for a half-wave transducer design of the type described. The large end of the Fourier horn is essentially cylindrical, so that breaking up the cross-section into a central shaft and concentric outer-ring will not alter the wave shape assumed during calculations.

What is claimed is:

1. An electromechanical transducer consisting of a half-wave resonant horn structure having a first part of a relatively fixed diameter and a second part of a lesser diameter integrally formed with said first part, and piezoelectric driving means also integrally formed in said half-wave resonant horn structure for driving said transducer, said driving means being at a location of lower velocity.

2. An electromechanical transducer as set forth in claim 1 further comprising compressive means for maintaining a uniform static stress on said vibrational means.

3. An electromechanical transducer as set forth in claim 1 wherein said location of lower velocity of said half-wave resonant structure is in a region near the node.

4. An electromechanical transducer as set forth in claim 1 wherein said driving means comprises a pair of piezoelectric elements and an electrode positioned therebetween.

5. An electromechanical transducer as set forth in claim 1 wherein said first part comprises a tensile member forming a structural support, a piezoelectric element positioned at the inner end of said tensile member, a compression member rearwardly of said piezoelectric element, and means for applying pressure to said compression member for maintaining a uniform static stress on said piezoelectric element; said tensile member, compression means, pressure means all integrally positioned with respect to each other for forming together with said second part a single resonant structure, and means to excite said elements.

6. In an electromechanical transducer as set forth in claim 5 wherein said first part includes shoulder means formed thereon and said piezoelectric element having a side portion abutting against said shoulder means, said compression member comprising spacer means abutting against the opposite side of the piezoelectric driving means and extending rearwardly therefrom, said tensile member also extending rearwardly of the piezoelectric driving means and having an end portion substantially coterminous with the end of the transducer, thread means on the end portion of the tensile member, and nut means engaging the thread means for exerting a static pressure against said spacer means and said piezoelectric driving means.

7. The electromechanical transducer of claim 6 wherein the piezoelectric driving means, spacer means and tensile member are all arranged concentrically of one another.

8. A transducer as set forth in claim 1 wherein said vibrational means is integrally positioned within said first part, and compressive means for maintaining a uniform static stress on said vibrational means.

9. An electromechanical transducer as set forth in claim 1 wherein said first part further comprising a tensile member having a central portion reduced in diameter, a piezoelectric element having a disc shape with a centrally positioned aperture adapted for receiving said reduced diameter portion, a concentric compression means having a central aperture and also adapted for receiving said reduced-diameter portion adjacent to said discs, a pressure means around and in pressure engagement with said reduced-diameter portion to maintain a uniform axial static stress on said piezoelectric element; said tensile member, piezoelectric element, compression means, and pressure means all integrally positioned with respect to each other to form together with said second part a single resonant structure, and means to excite said elements.

10. An electromechanical transducer as set forth in claim 9 wherein said piezoelectric element comprises a pair of discs and wherein said means to excite said elements comprises a disc-shaped electrode having an aperture also adapted to receive said turned-down portion and positioned between said pair of discs.

11. An electromechanical transducer as set forth in claim 10 further including means for electrically insulating said piezoelectric element and said electrode from said reduced-diameter portion.

12. An electromechanical transducer as set forth in claim 1 wherein said first part includes a shell having a bore formed therein, a piezoelectric element positioned within said bore at the bottom thereof at a region close to the node of said structure, said shell of said first part forming a tensile member, compression means positioned within said bore, and pressure means positioned at the far end of said bore for maintaining a uniform static stress on said piezoelectric element; said tensile member, piezoelectric element, compression means, and pressure means all integrally positioned with respect to each other to form together with said lower part a single resonant structure, and means to excite said elements.

13. An electromechanical transducer as set forth in claim 10 further including means for electrically insulating said piezoelectric element and said electrode from said other members.

References Cited

UNITED STATES PATENTS

| 2,514,080 | 7/1950 | Mason | 310—8.2 |
| 2,991,594 | 7/1961 | Brown | 51—59 |
| 3,328,610 | 6/1967 | Jacke | 310—8.2 |

DAVID X. SLINEY, *Primary Examiner.*

J. D. MILLER, *Examiner.*